US009557551B2

(12) United States Patent
Staples

(10) Patent No.: US 9,557,551 B2
(45) Date of Patent: Jan. 31, 2017

(54) SYSTEM AND APPARATUS FOR ILLUMINATING A SPECIMEN

(71) Applicant: University of Maine System, Bangor, ME (US)

(72) Inventor: Joseph Knight Staples, Gorham, ME (US)

(73) Assignee: University of Maine System, Bangor, ME (US)

( * ) Notice: Subject to any disclaimer, the term of this patent is extended or adjusted under 35 U.S.C. 154(b) by 0 days.

(21) Appl. No.: 14/335,730

(22) Filed: Jul. 18, 2014

(65) Prior Publication Data
US 2015/0022883 A1 Jan. 22, 2015

Related U.S. Application Data

(60) Provisional application No. 61/847,672, filed on Jul. 18, 2013.

(51) Int. Cl.
*G02B 21/08* (2006.01)

(52) U.S. Cl.
CPC .................. *G02B 21/084* (2013.01)

(58) Field of Classification Search
CPC ....... G02B 21/10; G02B 21/06; G02B 21/084; G02B 21/082; G02B 21/125; G02B 6/0001; G03B 15/06; F21Y 2101/02; F21Y 2103/003; G02F 1/133615
USPC .......... 359/385, 387, 388, 390; 362/89, 109, 362/119, 120, 157, 184, 185, 186, 190, 362/191, 209, 227, 232, 234, 362/249.01–249.14, 253, 362, 368, 370, 362/371
See application file for complete search history.

(56) References Cited

U.S. PATENT DOCUMENTS

| 5,353,786 A * | 10/1994 | Wilk .................... G02B 6/0005 362/219 |
| 5,449,138 A * | 9/1995 | Ciancio ................. F16M 11/06 248/123.2 |
| 8,331,020 B2 | 12/2012 | Soppelsa et al. |
| 2006/0209530 A1* | 9/2006 | Schaak ................... F21S 6/003 362/86 |
| 2007/0030565 A1* | 2/2007 | Soppelsa ................ G02B 21/34 359/385 |
| 2010/0039792 A1* | 2/2010 | Meyers .................... F21L 2/00 362/20 |

(Continued)

OTHER PUBLICATIONS

Kerr, P.N., et al., Entomological Society of America, Online http://www.ingentaconnect.com/content/esa/ae/2008/00000054/00000004/art00004, American Entomologist, 54:4:1987-200, (2008).

(Continued)

*Primary Examiner* — Stephone B Allen
*Assistant Examiner* — Rahman Abdur
(74) *Attorney, Agent, or Firm* — MacMillan, Sobanski & Todd, LLC

(57) ABSTRACT

The disclosed technology relates generally to a method and system for an improved lighting apparatus compatible with imaging small specimens for viewing or photographic purposes. In certain embodiments, the disclosed technology provides an apparatus for projecting light on specimens from opposing light sources at varying distances and angles. In certain embodiments, the apparatus includes an elongated stem that allows the light sources to be repositioned quickly, easily, and accurately. The elongated stem may be flexible and may be used in conjunction with a positioning system, such as a rack and pinion system, thereby allowing precise movement of the light sources.

21 Claims, 15 Drawing Sheets

(56) References Cited

U.S. PATENT DOCUMENTS

| | | |
|---|---|---|
| 2010/0103511 A1 | 4/2010 | Soppelsa et al. |
| 2011/0026113 A1 | 2/2011 | Paulus et al. |
| 2011/0090072 A1* | 4/2011 | Haldeman .............. B60Q 1/305 340/431 |
| 2013/0114262 A1* | 5/2013 | McClellan .............. F21S 2/005 362/249.03 |

OTHER PUBLICATIONS

Product: Diffuse illumination with movable illumination shield Leica LED3000 DI, Leica Microsystems, (2014) [Retreived from the Internet Oct. 22, 2014] http://www.leica-microsystems.com/products/stereo-microscopes-macroscopes/illumination/details/product/leica-led3000-di/.

Product: LED Spotlight Illuminator wth Goosneck, Leica LED3000 SLI , Leica Microsystems, (2014), [Retreived from the Internet Oct. 22, 2014] http://www.leica-microsystems.com/products/stereo-microscopes-macroscopes/illumination/details/product/leica-led3000-sli/.

* cited by examiner

SYSTEM AND APPARATUS FOR ILLUMINATING A SPECIMEN

RELATED APPLICATIONS

The present application claims priority to U.S. Provisional Application No. 61/847,672, entitled "Illumination System" and filed Jul. 18, 2013, the content of which is hereby incorporated by reference.

FIELD OF THE INVENTION

The disclosed technology relates to lighting for high resolution, close-up imaging of small subjects or specimens. More specifically, the disclosed technology pertains to an adjustable lighting apparatus and methods adaptable for light microscopy, photomicrography, and macrophotography.

BACKGROUND

Lighting is an art that when skillfully applied may enhance the color, shadow, and texture of images for viewing and photography. Special techniques are often needed for optimal results, particularly if images are magnified. For instance, certain image characteristics may be improved by aiming light on a given specimen from two or more lights sources simultaneously. Types of lighting sources are numerous; however advances in light-emitting diode (LED) technologies over the past decade have resulted in light sources with relatively low heat load, small size, and minimal energy requirements compared to many other lighting technologies. Subsequently, LEDs are a natural choice for enhanced imaging, particularly when multiple sources are prescribed.

Enhanced imaging may be fairly unpredictable for a given specimen and experimentation with specific placement of light sources is often required. Indeed, some image details are only revealed with careful adjustment to the intensity and angle of light. Depending on the features to be enhanced, light sources that are too intense may be made more distant or positioned obliquely for better results. Yet, oblique positioning will not always improve contrast. Instead desired clarity may require fairly concentrated direct, front or back lighting.

At the same time, direct and concentrated lighting may produce unwanted shadows, reflections, and glare. These and other artifacts from light that is overly intense can be minimized if the light is dimmed or diffused. Problems from too much light may also be corrected with shades, filters that help limit specific wavelengths, or with polarized lenses that can scatter and soften the light as required per application.

Imaging equipment incorporating features for experimenting with lighting adjustments are plentiful. Diffusers, reflectors, variable intensity light sources, and positioning adjustments are typically incorporated into light microscopes. Annular light rings are also combined to provide adjustable light quality from devices having multiple sources of light.

An example of a state of the art lighting device is found in U.S. Patent Publication No. 2011/0026113 of Paulus. The publication's disclosure describes a device incorporating a flexible and elastic reflector, moveable through different positions with respect to a sample placed on a microscope stage. The reflector houses multiple light sources in an annular arrangement and provides diffuse lighting at different distances and positions from the sample to the extent that the reflector is configurable.

Still, there is a need to further advance lighting for close imaging of small specimens. An apparatus with the capacity to position multiple light sources at varying distances and angles around specimens that also offers the operator the ability to independently adjust individual light sources would make illuminating specimens easier to optimize while providing easy access to staged specimens. In accordance with the present invention, related embodiments of a lighting apparatus and methods improve upon advantages of known devices.

SUMMARY

The disclosed technology relates generally to a method and system for an improved lighting apparatus compatible with imaging small specimens for viewing or photographic purposes. In certain embodiments, the disclosed technology includes a device that is a multipurpose laboratory and microscope light designed to provide adjustable annular and semi annular illumination for bright-field, dark-field, transmitted, and other oblique lighting applications. The unique combination of lighting options obtainable with this device are useful for observation of small objects where fine control of light direction, intensity, and distribution directly impacts observable surface features and object translucence. The device includes an expandable annular boundary composed of longitudinally curved plates containing light sources and/or reflective surfaces along the concave boundary. In certain embodiments, each curved plate (i.e., jaw) is connected to a hub with a hinge that articulates perpendicular and rotates parallel to the plate. The hub is further supported by an adjustable stem that is connected to an adjustable base providing an additional range of movement, respectively, perpendicular and parallel to the optical plan of the observer or imaging device. The unique combination of adjustable features of the device allows the user to adjust the distance and angle between opposing light sources thus providing options for achieving semi annular to complete annular oblique illumination while providing easy access to the subject being observed.

The disclosed technology may be used for the study of macroscopic objects where the quality of light directly impacts the observation. Gemologists and jewelers may use the disclosed technology to inspect gems for quality and value. Gem grading is based on four main criteria: cut, clarity, color, and carat. This inspection requires both bright-field and darkfield illumination techniques that may be provided by the disclosed technology. Similarly, professions in the field of contamination control may use the disclosed technology to perform analyses of substances in effort to control the existence, growth and spread of contamination in a given area, such as in lakes, cities, and buildings. Certain types of contamination control rely on the observation of small objects such as invasive plants, small insects, and other biological specimens which may be illuminated for viewing using the disclosed technology. Material evaluation specialists may illuminate materials for studying the strengths and weaknesses of materials to be used for manufacturing products. Additionally, forensic scientists, such as entomology, engineering, ballistics, and anthropology, may use the disclosed technology to assist in analyzing evidence involved in criminal and civil litigation. Another example use for the disclosed technology is as a general bench-top light for hobbyists.

In certain embodiments, the disclosed technology provides an apparatus for projecting light on specimens from opposing light sources at varying distances and angles. In certain embodiments, the apparatus includes an elongated stem that allows the light sources to be repositioned quickly, easily, and accurately. The elongated stem may be flexible and may be used in conjunction with a positioning system, such as a rack and pinion system, thereby allowing precise movement of the light sources.

For example, in one embodiment, the lighting apparatus is compatible with a light microscope for positioning direct, front, back, or oblique lighting onto small specimens. Additionally, the disclosed technology provides an apparatus able to aim conditioned or un-conditioned light as needed for enhancing the images of small specimens.

In certain embodiments, the light sources are be mounted (e.g., removably) on a respective jaw that is coupled to a hub by a pivoting hinge (e.g., double hinging joint or joint composed of a ball and socket configuration). This allows the position of the hub to be fixed by the elongated stem as well as the light sources. The light sources may then be repositioned relative to the stem due to the pivoting hinges. This allows imaging of specimens such that specimens may be easily accessed while residing on the stage of a microscope, platform of another type of imaging equipment or other imaging substrate. Thus, the disclosed technology provides maximum adjustability and the ability to obtain high resolution, high contrast images of specimens.

In one aspect, the disclosed technology is directed to a lighting apparatus that provides diffuse, reflected, or direct incident lighting from a wide variety of positions while at the same time facilitating access to a specimen. The apparatus allows its operator to finely control lighting for enhancing observable surface features and characteristics. The apparatus has an expandable boundary from which at least two light sources are used to simultaneously project light on a specimen from different directions. The apparatus exists in various embodiments having such features as adjustable light intensity and extensive capacity for adjusting direction and distance of lighting sources.

In certain embodiments, the boundary and accompanying light sources are attached by a hub to a highly positionable stem. The stem is used to position the hub and expandable boundary above, below, or aside, and at different distances and angles from the specimen. The boundary itself may also be expanded or contracted to achieve desired imaging results or to further facilitate access to the specimen.

The expandable boundary may be comprised of a set of pivoting jaws. The jaws may vary in form. For example, the jaws may be formed as arcs with a concave surface in which light sources are situated to commonly illuminate a given specimen. The jaws may be positioned as an annular ring or pivoted open or closed to surround the specimen with up to 360 degrees of direct, diffuse, or reflected light. In certain embodiments, the jaws are attached to a hub or other support component by double swiveling joints which allow the jaws to also be rotated about a perpendicular axis for aiming light at a specimen from varying angles above or below or aside.

In another aspect, methods are disclosed for illuminating specimens for optimal results. In certain embodiment, the stem of an illuminating apparatus is adjusted so that its expandable boundary is positioned to surround a specimen for imaging. Subsequently, the expandable boundary is opened and the specimen is replaced with another or simply accessed for physical adjustment, such as changing the specimen stage positioning or substrate, changing the configuration of either, or conditioning the specimen, etc. In other embodiments, an expandable boundary surrounding a specimen leaves room for the specimen to be accessed from above or below, depending on where the boundary is situated with respect to the specimen. In certain embodiments, an expandable boundary of an adjustable lighting apparatus is comprised of double swiveling jaws and at least one jaw is positioned above or below a specimen and swiveled about a perpendicular axis to provide direct front or back lighting to a specimen.

The disclosed technology, in certain embodiments, includes an adjustable lighting apparatus for illuminating a specimen while facilitating access to the specimen. The apparatus may include a plurality of pivotable jaws collectively defining an expandable boundary positionable to at least partially surround the specimen. Each jaw of the pivotable jaws has a concave interior surface and has one or more light sources (e.g., an LED, LED strip, and LED array) positioned within or against the interior surface for illuminating a specimen located within the expandable boundary. A portion of the concave surface of each respective pivotable jaw may include a reflective surface to reflect light from a respective light source. The concave surface of each pivotable jaw may include a stepped grooved configured to at least in part hold a respective light source.

The apparatus may also include a hub to which the plurality of pivotable jaws are connected by a respective pivoting hinge (e.g., a double swiveling joint), thereby permitting the position of the plurality of pivotable jaws to be varied such that the specimen may be illuminated and accessed by repositioning of one or more of the pivotable jaws; and an elongated stem (e.g., a flexible stem or sliding rod) connected to the hub at a first end and a base at a second end, thereby allowing positioning of the pivotable jaws in at least two degrees of freedom.

In certain embodiments, the base includes a vertical post to which the elongated stem is slideably connected by an adjustable clamp, thereby permitting horizontal and vertical adjustment of the plurality of pivotable jaws.

In certain embodiments, the base includes a rack and pinion system slideably connected to the elongated stem and a vertical post, thereby permitting horizontal and vertical adjustment of the plurality of pivotable jaws.

The apparatus may include a power source within the base. The power source may include an on/off switch and a dimming circuit in electrical communication with the light sources for adjust the intensity of the light sources.

The apparatus, in certain embodiments, includes a plurality of light diffusers each associated with at least one of the light sources. Each of the plurality of light diffusers are removeably coupled to a respective pivotable jaw to cover a respective light source.

Each of the plurality of pivotable jaws may include a plurality of louvers, a raised grid system, and/or any shaped raised surface (e.g., raised semicircles or dots) for providing radiant cooling. Each of the plurality of pivotable jaws may also include a protrusion on an upper edge of each pivotable jaw for holding a petri dish in place when the plurality of pivotable jaws are closed to form a continuous ring.

The disclosed technology, in certain embodiments, includes an adjustable lighting apparatus for illuminating a specimen while facilitating access to the specimen. The apparatus may include a plurality of pivotable jaws collectively defining an expandable boundary positionable to at least partially surround the specimen. Each jaw of the pivotable jaws has a concave interior surface and has one or more light sources (e.g., an LED, LED strip, and LED array) positioned within or against the interior surface for illuminating a specimen located within the expandable boundary. A portion of the concave surface of each respective pivotable jaw may include a reflective surface to reflect light from a respective light source. The concave surface of each pivotable jaw may include a stepped grooved configured to at least in part hold a respective light source.

The apparatus may include a hub to which the plurality of pivotable jaws are connected by a respective pivoting hinge, thereby permitting the position of the plurality of pivotable jaws to be varied such that the specimen may be illuminated and accessed by repositioning of one or more of the pivotable jaws; an elongated stem connected to the hub at a first end and movably connected to a rack and pinion system; and a vertical post connected to a base at a second end and movably connected to the rack and pinion system.

The rack and pinion system, in certain embodiments, includes a first gear with a plurality of teeth configured to engage a plurality of teeth on the vertical post. The first gear is coupled to a first knob, thereby permitting vertical adjustment of the plurality of pivotable jaws by turning of the first knob. The rack and pinion system may also include a second gear with a plurality of teeth configured to engage a plurality of teeth on the elongated stem. The second gear is coupled to a second knob, thereby permitting horizontal adjustment of the plurality of pivotable jaws by turning of the second knob.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
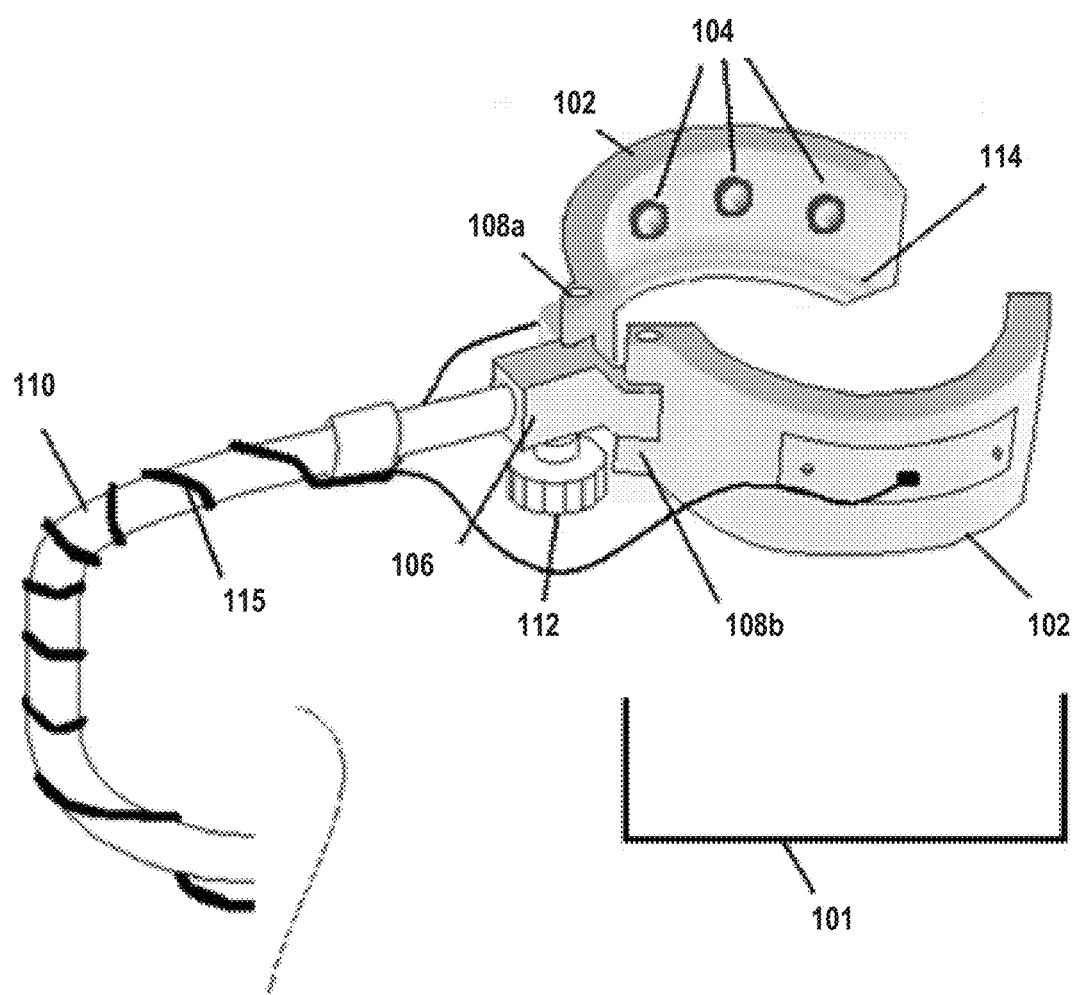
FIG. 1 is a portion of a perspective view of an adjustable lighting apparatus having an expandable boundary comprising concave jaws.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

A number of different terms are used to describe and claim the technology disclosed by this patent application. Unless otherwise specified, the terms are intended to have their broadest possible meaning within the requirements of the law. As used throughout this specification:

The term "above", when used to describe the relative position of one or more light sources with respect to a specimen being imaged, is synonymous with an arrangement wherein the light source is on the same side of the specimen as a particular objective or camera lens being used to obtain the specimen image.

The term "below", when used to describe the relative position of one or more light sources with respect to a specimen being imaged, is synonymous with an arrangement wherein the light source is beyond the specimen from a particular objective or camera lens being used to obtain the specimen image.

The term "hub" is synonymous with the term "backplate" and is intended to describe the component of an adjustable lighting apparatus that supports an expandable boundary on a stem.

The term "image" when used as a noun means the optical representation of a specimen captured through an objective or lens of a microscope or other type of imaging equipment. When used as a verb, the term "image" means to view, save, photograph, record, or otherwise capture an optical representation of a specimen through an objective or lens of a microscope or other type of imaging equipment objective.

The term "incident light" refers to light that is oblique or reflected or projected directly from a light source onto a specimen.

The term "LED strip" refers to strips that function as a light source comprising an array of light emitting diodes. This includes but is not limited to a lighting material of the type manufactured by Shenzhen Illusion LED Ltd. of Guangdong, China having multiple light emitting diodes communicating electrically in translucent plastic. LED strips used with embodiments of the disclosed technology may or may not be embedded in or covered by a light diffusing material.

The term "operator" refers to a human functioning to control an adjustable lighting apparatus or in some contexts may instead refer to an automated machine or robot performing a similar function.

The term "opposing" when used to describe the position of light sources refers to at least one pair of light sources that are fixed at across from one another on an expandable boundary. Opposing light sources may be aimed more or less in the direction of one another and depending on the structure of the expandable boundary may instead be aimed at a specimen from above or below.

The term "perpendicular" or "perpendicular axis" refers to an axis about which an expandable boundary component of the disclosed technology may rotate, the axis being perpendicular to a hinge pin of a joint about which a jaw is pivoted to be closer or farther from another jaw or, for apparatus without pivoting joints, likewise refers to an axis that is generally parallel to the plane of a specimen stage or platform.

The term "specimen" is intended to include materials, samples, or small subjects that are viewed or photographed at relatively close distances using light microscopy, photomicrography, and macrophotography.

The term "substrate" is intended to include the material upon which a specimen is placed or allowed to reside for imaging. A substrate may be used to support a specimen or provide a background with or without a microscope stage or imaging equipment platform.

The term "view" or "viewing" is intended to refer to imaging for the purpose of observing, working upon, or otherwise manipulating a specimen, rather than photographing, saving, or recording an image.

Bearing these terms in mind, the disclosed technology is a highly adjustable lighting apparatus having an expandable light source boundary. The boundary is designed to retain two or more light sources for positioning at numerous angles around a given specimen. The expandable boundary may be achieved by one of several means such as rotatably mounting two or more lighted reflectors on sliding tracks or similar guides providing adjustable movement, or pivoting independent light sources from a hub supported hinge, so long as the mechanism allows the boundary to engulf the specimen, move the light sources closer or farther from the specimen on opposing sides, and aim mobile light sources at the specimen from significantly different angles.

In some implementations, the boundary is comprised of a set of pivoting jaws which are hinged to a hub that is itself positionable at numerous points by virtue of a highly adjustable supporting stem. The hub is rotatable and may be secured at various positions around the stem to increase the range of angles by which light can be aimed at a specimen.

In addition to the highly variable placement and positioning if its light sources, a lighting apparatus of the disclosed technology may also include features that vary physical characteristics of light originating from one or more of its light sources. Filters, diffusers, dimmers, and reflectors may be used alone or in combination to provide a particular character of light for optimal imagining.

As shown in FIG. 1, an apparatus is adapted for aiming multiple light sources from various positions. Light originates from the light sources 104 held in an expandable boundary 101. The boundary 101 is adjustable in size and supported by one end of a hub 106, so that the boundary 101 is positionable around a specimen. The hub 106 is connected at its other end to a supporting stem 110 that is moveable through various positions. The opposite end of the stem 110 is fixed in place and may be connected to a base (not shown). The base may be a stand-alone base or may be a coupling device (e.g., a clamp) for attaching the apparatus to another object, such as a microscope, camera, or a tripod. Combined movement of the stem 110, hub 106, and expandable boundary 101 allow for nearly infinite adjustments to the placement of light sources in relation to the specimen.

Still referring to FIG. 1, the expandable boundary 101 is comprised of two jaws, each jaw 102 being concave along one side. Fixed within the concave side of each jaw 102 are the multiple light sources 104. The light sources 104 are connected (wired and wirelessly) to a direct current power source (not shown) for aiming light at a specimen. The proximate end of each jaw 102 is hinged to the hub 106 by a joint 108 so that the jaws 102 may be pivoted at the joint and moved closer to or farther away from a specimen located between the jaws 102. In some implementations, the hub 106 is rotatably connected to a proximate end of a flexible stem 110. In some implementations, as discussed below, the stem 110 is not flexible. The hub 106 may be fitted with a set screw 112 for securing the position of the hub 106 with respect to the stem 110 when the set screw is tightened.

Each of the jaws 102 may include steps 114 on their concave surface which form a groove across the concave surfaces of the jaws 102 to allow a light diffusing material to be fitted into place over the light sources 104 when diffused light is preferred. The apparatus may be used with or without diffusing material fitted to one or both of jaws 102. Diffusing material may be used to diffuse the light reaching the specimen, thereby providing softer light and helping to eliminate unwanted shadows and glare. The concave surfaces of the jaws 102 may also be used to reflect light toward and around the specimen. When the expandable boundary 101 is positioned to engulf the specimen, the amount of reflective light is increased and helps to eliminate uneven illumination.

The light sources 104 of the apparatus in FIG. 1 may be wired to a D.C. power source (not shown) that includes an on/off switch. In some implementations, the output of the power source is variable so as to dim the intensity of light produced by the light sources 104. Wiring 115 from the power source to the light sources 104 may be run along the outside of the stem 110. In some implementations, the wiring may instead be run internally through the stem 110 if desired.

The light sources 104, in some implementations, are LEDs (e.g., small, powerful LEDs) in electrical communication with an AC to DC voltage power source energized by a typical electrical outlet. In other implementations, larger and more traditional lamps or bulbs are used as light sources 104 and/or the power source is comprised of one or more batteries within a hub, base, or jaw(s). In some implementations, light sources 104 in concave jaws 102 are LED light strips or arrays. The light sources 104 may provide diffuse, annular, reflected light to a specimen.

Referring again to FIG. 1, the hub 106 of the apparatus is supported by a flexible stem 110 that maintains its configuration until a threshold of force is applied. The stem 110 may be bent or straightened as needed to position the hub 106 with respect to a specimen. The stem 110 may also be twisted or the hub 106 rotated with respect to the axis of the stem 110. The two jaws 102, the hub 106, and the stem 110 are moveable through a wide range of positions to adjust the distance, intensity, and angle of light provided for imaging.

In some implementations, connections between the jaws 102 and hub 106 of the apparatus in FIG. 1 are relatively tight interference fit joints designed to resist movement and maintain desired positions of the light sources as a specimen is being imaged. Yet, the connections allow for movement so that the components may be repositioned when sufficient force is applied. In some implementations, connections between the jaws 102 and hub 106, and the construction of the stem are characterized by relatively loose fitting joints, connecting rigid components that require tightening with bolts or set screws or the like, once the components have been situated as desired. Adjustable stops may also be included on the jaws 102, hub 106, or components of the stem 110 to aid in quickly resuming a particular position after the expandable boundary 101 has been moved open for accessing a specimen.

Referring now to the disclosed technology in general, various embodiments of the apparatus may differ according to the means by which the stem is supported. Some embodiments include stems supported by bases that are independent from a microscope or other type of equipment alternatively used to image a specimen. The bases are attached to a smooth table by vacuum fittings or other means or the bases are simply heavily weighted for stability. In other embodiments, stems are removeably attached to microscopes or alternate imaging equipment with clamps, magnets, or similar means so that the lighting apparatus can be quickly disconnected. In still other embodiments, the stem of the apparatus is made integral with or more permanently fixed to a microscope or alternate imaging device with bolts, screws, or the like.

In some implementations, an adjustable lighting apparatus is freestanding and designed for use with a microscope or other type of imaging equipment that provides a horizontal stage surface for viewing a specimen. An example of an apparatus having these characteristics is shown in FIG. 2A.

Figure 2A:
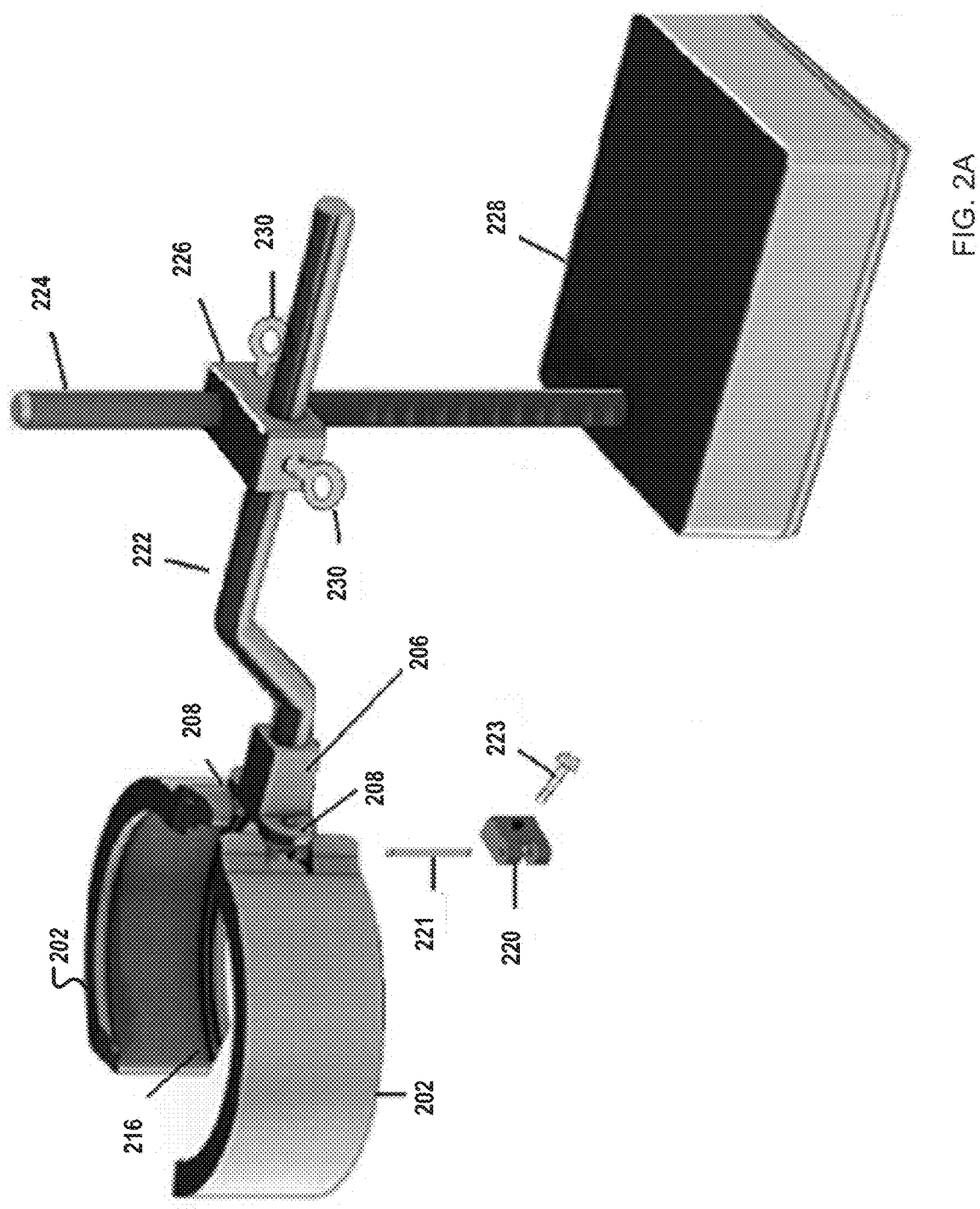
FIGS. 2A and 2B are illustrations of a full perspective and partially exploded view, respectfully, of an adjustable lighting apparatus adapted for LED strips.
Figure 2B:
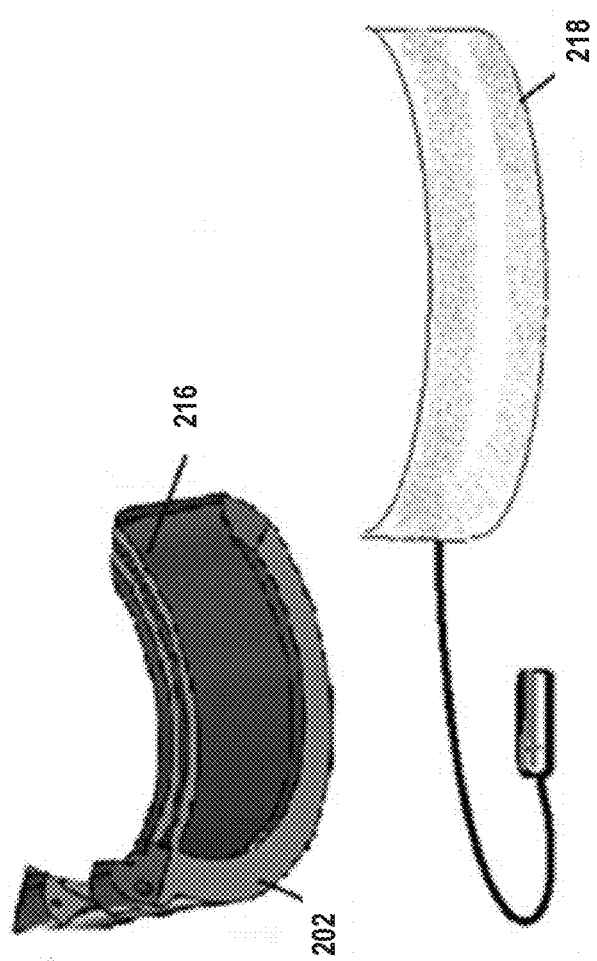

In some implementations, the expandable boundary of the apparatus is comprised of a set of jaws (two jaws in the example illustrated in FIG. 2A), with each jaw 202 including a concave surface having a stepped groove 216 to accept a LED strip (shown as 218 in FIG. 2B). In operation, the strips are in electrical communication with a power source and function as a pair of light sources that may be aimed more or less in the direction of a specimen being imaged. Each jaw 202 also includes a proximate end further comprising a portion of a joint 208 by which each jaw 202 connects to a shared hub 206. The joints 208 are each comprised of a hub barrel 220 that allows each of the jaws 202 to pivot on a separate hinge pin 221 for the purpose of varying the opening between the distal ends of the jaws 202, opposite the joints 208. When the apparatus is fitted with LED strips (such as the LED strip illustrated in FIG. 2B) and operated to project light on a specimen, increasing the opening between the distal ends of the jaws 202 expands the boundary and moves at least one of the jaws 202 a greater distance from the specimen, thereby decreasing the light intensity. At the same time, the jaws may be expanded for the purpose of accessing the specimen while being imaged without disrupting the position of the hub 206 as it is being maintained by the stem. The hub barrel 220 is attached to hub by a threaded fastener 223.

The supporting stem of the adjustable lighting apparatus shown in FIG. 2A is comprised of rigid horizontal and vertical components. As described above, the stem may also comprise a flexible member. As shown in FIG. 2A, a horizontal boom 222 is connected with the hub 206 at one end and slideably connected to the vertical post 224 by a clamp block 226. The bottom of the post 224 is attached to and stabilized by a weighted base 228 and supports the boom through the block 226. Both the horizontal boom 222 and vertical post 224 of the stem are cylindrical and sized to easily slide through bores the block 226 while also making contact with a corresponding thumbscrew 230 of a pair. With the thumbscrews 230 loose, the hub is situated with respect to the specimen by first sliding the rigid boom 222 and post 224 components of the stem into position as needed and then tightening the thumbscrews 230 to lock the hub 206 in place.

FIG. 2B is an illustration of an example jaw 202 with its LED strip 218 removed. The light sources, such as LED strip 218, may be removable. Additionally, the light sources may also be interchangeable. For example, the light sources maybe interchanged between an LED light source (e.g., cool white light LEDs), various colored light sources, near infrared infrared, and/or ultraviolet light sources. For example, utilizing LEDs that emit a narrow bandwidth in the lower UV range provides fluorescence capabilities that may be used in specific applications common to geosciences, forensics, or molecular and microbiology. The jaw 202 includes a concave surface having a stepped groove 216 to accept a LED strip 218. In operation, the strips are in electrical communication with a power source and function as a pair of light sources that may be aimed more or less in the direction of a specimen being imaged.

Figure 3:
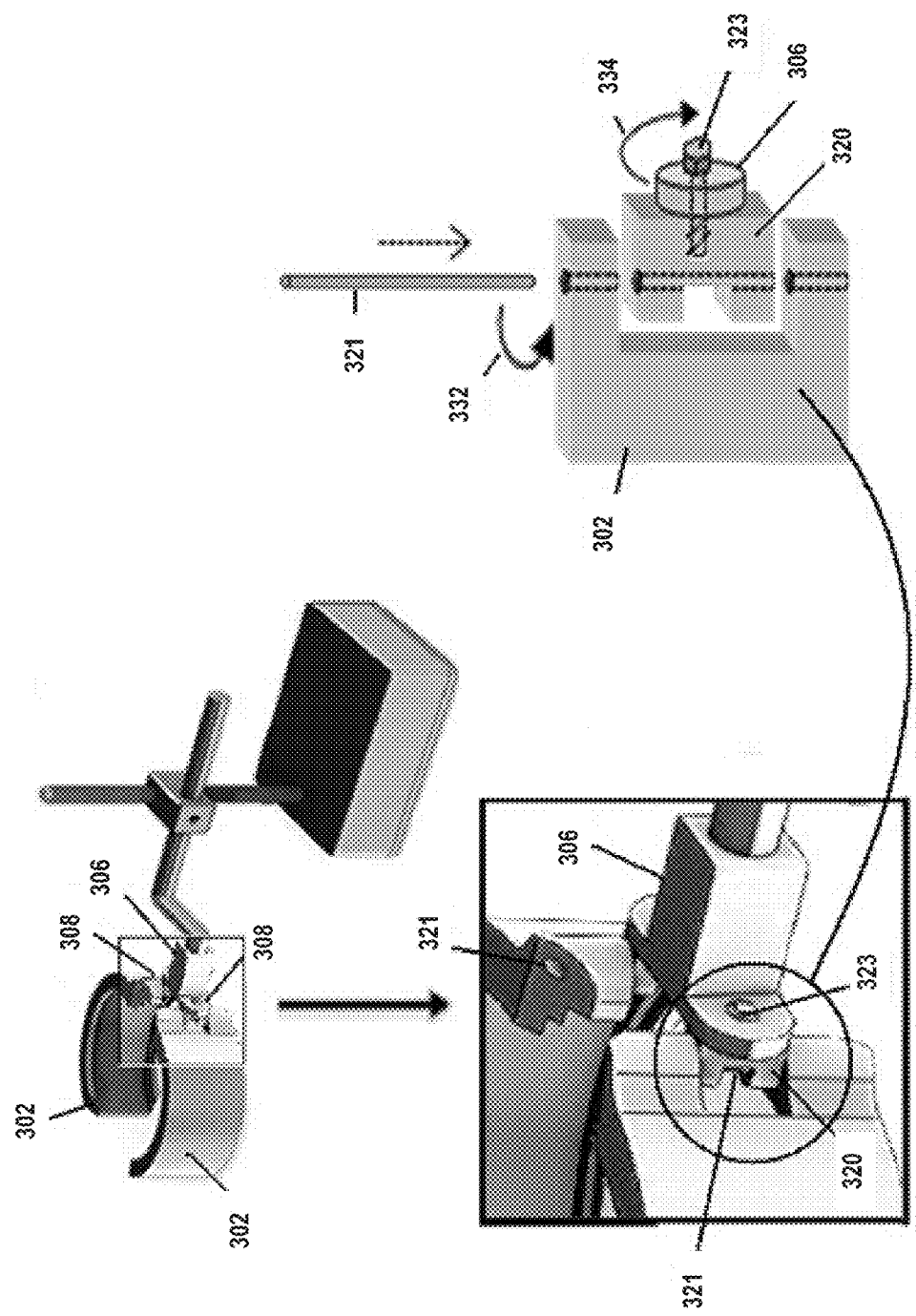
FIG. 3 is a perspective view of an example adjustable lighting apparatus showing an enlargement of double swiveling joints connecting its jaws and hub.

FIG. 3 illustrates an example lighting apparatus having an expandable boundary comprising two jaws 302 connected with a positionable hub 306 that is supported by a rigid stem and base. Again, the jaws 302 are each connected to the hub 306 by a pivoting joint 308. A portion of the apparatus is enlarged to show the structure of one of the joints 308 and is accompanied by a graphical representation having arrows that indicate the available movement provided by the joints.

As is shown in FIG. 3, the joints each comprise a pin 321 that serves to pivotably connect two wings of a hinge. The first wing of each joint is integrated with its corresponding jaw 302 and the second wing comprises a hub barrel 320 fastened to the hub 306. The jaws 302 and hub 306, being pivotably attached by the joints 308 allow each distal end of the jaws to pivot closer or farther apart from one another. In some implementations, the joints 308 are purposely fabricated to also rotate about an axis that is perpendicular to the pin of the joint or, in other words, generally parallel with a stage (not shown) on which a specimen would be placed for imaging. The combined movement results in double swiveling joints that allow each jaw to independently pivot and rotate with respect to the hub, as represented by the pivot arrow 332 and the rotation arrow 334, respectively.

In some implementations, the axes perpendicular to the pins, about which the jaws rotate, comprise threaded fasteners 323 which penetrate the hub 306 and are threadably secured to the barrels 320. The fasteners are threaded relatively tightly and generate friction between the barrels and the hub 306 to keep the jaws from rotating until a particular threshold of torque is applied. In addition to the range of positions through which the jaws may be pivoted, the variability of jaw rotation further increases the variety of angles and distances from which light may be aimed at a specimen.

Embodiments of the disclosed technology having these or other similar double swiveling joints, such as ball and sockets or systems using two pins, are well suited for creating a variety of darkfield, oblique, and brightfield episcopic and diascopic lighting conditions. For instance, adjusting a double swiveling lighting apparatus so that its expandable boundary is supported above a specimen and rotating the jaws to aim light directly at the specimen from above results in the light being scattered by the specimen and provides enhanced contrast in a darkfield view. Conversely, adjusting the same apparatus so that the expandable boundary is below a specimen and rotating the jaws to pass light through the specimen results in light being absorbed by the specimen in a brightfield view. As with more simply jointed embodiments, embodiments of the disclosed technology with double swiveling joints also have the capacity to position light sources alongside specimens for imaging them with oblique or incident light.

Figure 4:
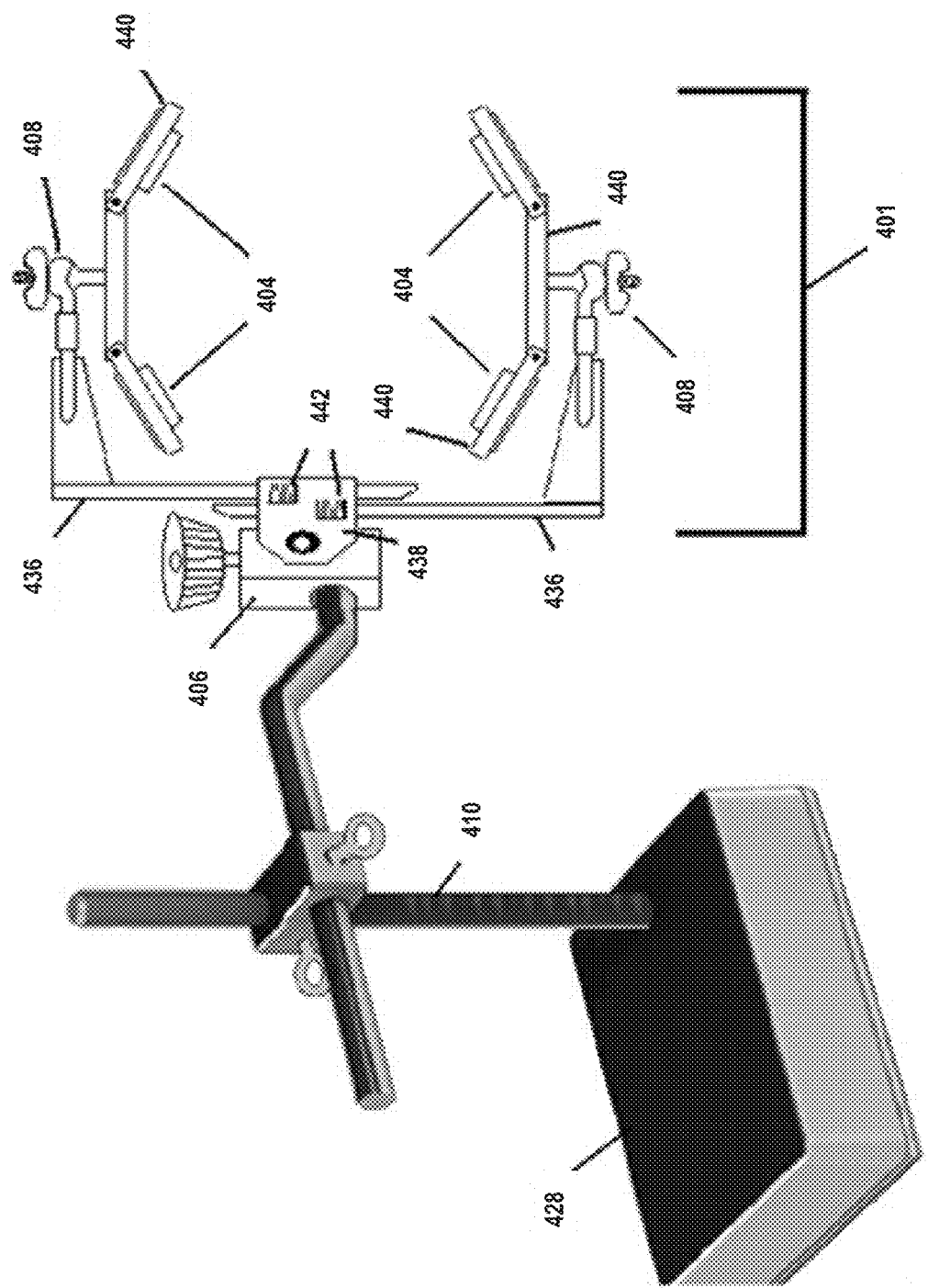
FIG. 4 is a perspective view of an example adjustable lighting apparatus having an expandable boundary comprising sliding frames and hinged reflectors.

FIG. 4 is an illustration of an example adjustable lighting apparatus with an expandable boundary 401 positioned for inspection. In this example, the expandable boundary 401 is comprised of a pair of slideable frames 436 supported by a carrier 438, which itself is fixed to one end of a hub 406. The other end of the hub 406 is connected to and supported by a rigid stem 410 that is stabilized by a weighted base 428. Other types of stems may be used, such as the flexible stem above. The expandable boundary may include reflectors 440. In this example, four of the reflectors 440 are incorporated a single light source 404. The reflectors 440 in this example are hinged together in series such that a group of three reflectors 440 is associated with each frame 436 and the central reflector of each group is connected to its corresponding frame by a double swiveling joint 408. The apparatus, in some implementations, is employed by situating the base 428 on a bench top in proximity to a platform or microscope stage on which a specimen is placed for imaging and then positioning the lighting sources to enhance the specimen image.

In some implementations, each linear frame 436 of the expandable boundary 401 is slideably held to the carrier 438 by guides (not shown) and engages threads of one of two adjustment wheels 442 that are also held within the carrier 438. The frames 436 slide independently from one another as the wheels 442 are turned and may be adjusted to change the distance between reflector groups and to vary the position of light sources 404 with respect to the specimen.

The highly adjustable apparatus shown in FIG. 4 may be used to optimize lighting by experimenting with the positions of the light sources as well as the physical characteristics of their projected light. When placed in the vicinity of a microscope or other imaging equipment, the reflectors of the expandable boundary may be adjusted to form a ring that will surround the specimen with light that is projected from multiple positions and different directions. In addition to providing oblique lighting, the expandable boundary may be moved above or below the specimen for darkfield or brightfield lighting purposes with or without adjustment to the double swiveling joints. As with other embodiments, the characteristics of light projecting from the sources may be further adjusted by diming or fitting one or more of the light sources with a filter or light diffusing material.

Figure 5:
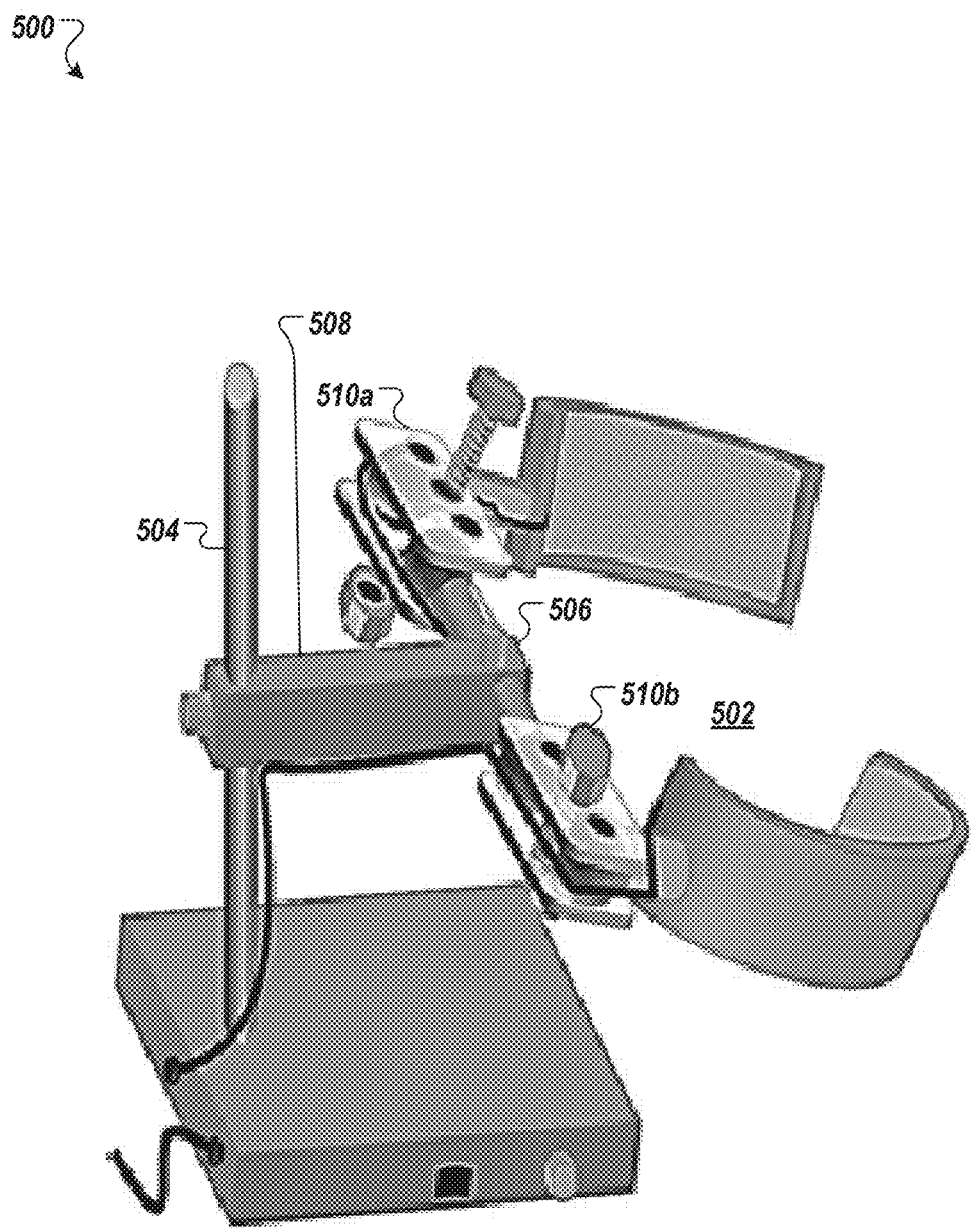
FIG. 5 is a perspective view of an example adjustable lighting apparatus having double swiveling ball and socket joints for adjusting an expandable boundary.

Referring now to embodiments of the disclosed technology in general, the adjustable distance between light sources allows the apparatus to accommodate the observation of relatively large specimens being imaged for microscopy or photography. Embodiments having independent movement of opposing light sources as the result of pivoting jaws or sliding frames or the like further support asymmetrical positioning of the light sources for added versatility. In some implementations, double swiveling joints or similar functioning mechanisms may be used for positioning the light sources and providing the greatest range of angles and distances from which light can be projected on a specimen. This includes ball and joint mechanisms as illustrated in FIG. 5 as well as mechanisms, such as the mechanism illustrated in FIG. 4, that utilize multiple pins. Such features exemplify embodiments of an apparatus that enhances the adjustability of lighting for such fields as anthropology, biology, electronics, entomology, geology, gemology, and mineralogy.

FIG. 5 is an illustration of an example adjustable lighting apparatus 500 with an expandable boundary 502 that is adjustable for size as the result of ball and socket joints. The expandable boundary is connected to a rigid stem 504 through a combined hub 506 and boom 508 component that is slideable along the stem 504. The ball and socket joints 510 are double swiveling to provide the benefits previously described.

Figure 6A:
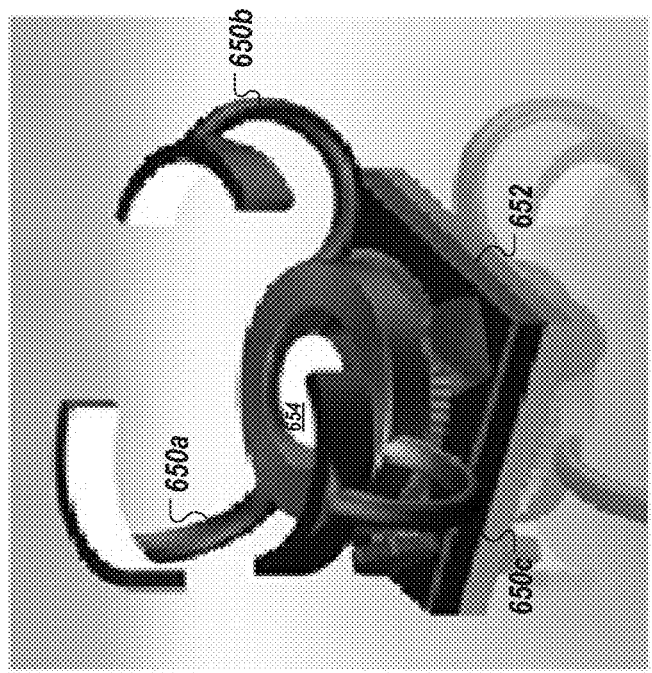
FIGS. 6A and 6B is a perspective view of two example adjustable lighting apparatus having expandable boundaries which may be adjusted by positioning separate supporting stems.

In some implementations, a wide range of illumination angles and distances are provided by expandable boundaries supported by multiple stems. As shown in FIG. 6A, an expandable boundary may include two concave reflective arrays that are each joined to one of two flexible supporting stems 610. The stems 610 may be each slideably connected to a shared collar 612 that is adapted for being secured around a main objective of a microscope. The stems 610 can be moved in and out of the collar 612 so that the expandable boundary is above, aside, or below a specimen (not shown). The arrays may include numerous LEDs (e.g., an LED array or strip) powered to function as light sources for the apparatus. In addition to the in and out movement, in some implementations, the expandable boundary may be adjusted by bending or twisting the flexible supporting stems 610 through a wide range of positions and angles, including one that adjusts the arrays to completely encircle a specimen.

Figure 6B:
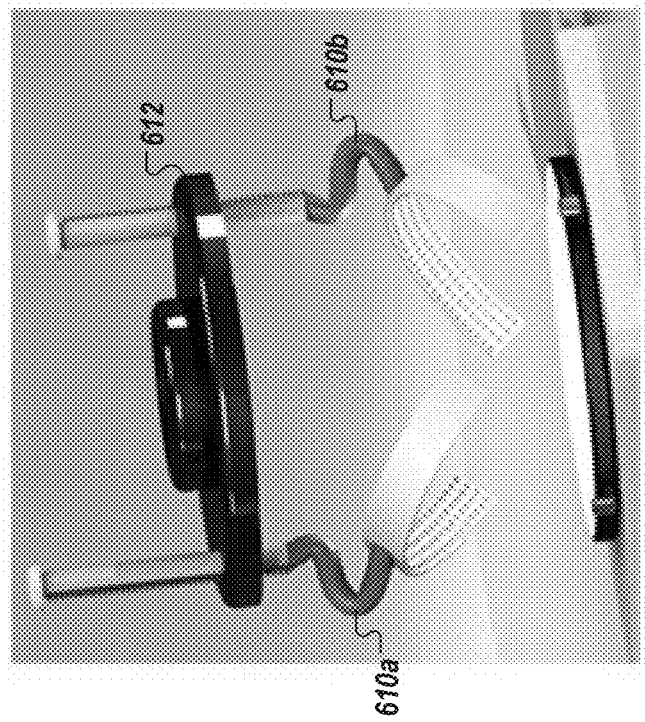

FIG. 6B is an illustration of an example an expandable boundary with three concave arrays serving as light sources are each joined to one of three flexible stems 650. Instead of being connected with a collar, the stems are secured to a base 652 having an additional light 654 for enhancing transmitted (diascope) lighting. As with the apparatus of FIG. 6A, the expandable boundary may be adjusted by bending or twisting the stems 650 through a wide range of positions and angles, including one that adjusts the arrays to completely encircle a specimen (not shown), but positioning the expandable boundary above, aside, or below a specimen is not accomplished by moving the stems in and out of their attachment to the base. Rather, moving the expandable boundary above, aside, or below a specimen is accomplished by simply bending, or in the extreme folding, the flexible stems as needed.

Referring now to the disclosed technology in general, it will be appreciated by persons skilled in the art that the range of expandable boundary positions for many of the apparatus embodiments may be complemented by providing a specimen at alternate heights such as by placing the specimen on a suitably positioned substrate or adjustable stage, etc.

Figure 7:
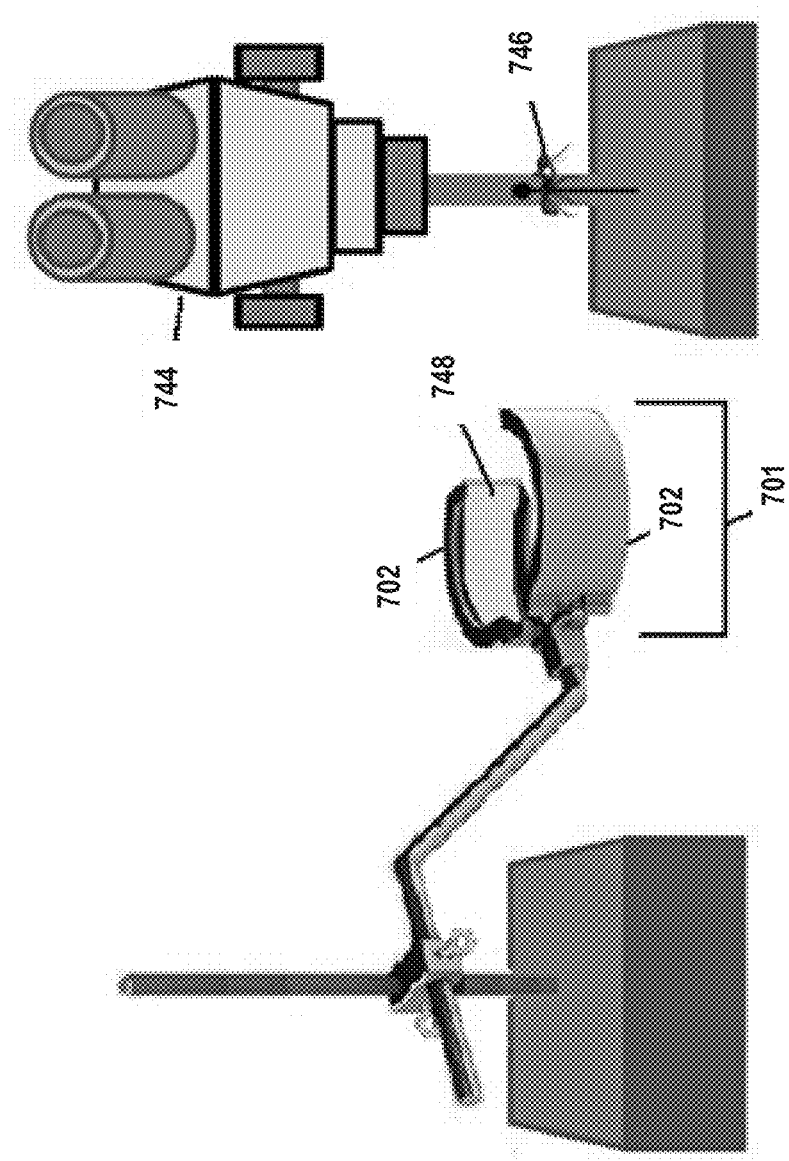
FIG. 7 is a perspective view of a specimen on the stage of a light microscope in conjunction with an example adjustable lighting apparatus.

The disclosed technology can be used in various ways, depending on the needs of a particular specimen as well as the embodiment of the apparatus being employed. In one example, an embodiment having double swiveling joints and an expandable boundary comprising pivoting jaws is selected for imaging a specimen on a microscope stage. FIG. 7 is an illustration of an example lighting apparatus and a microscope 744 with a specimen 746. In this example, within the stepped jaws 702 are LED strips covered by light diffusing material 748. The expandable boundary 701 of the apparatus can be positioned either before or after the specimen is configured. However, if the boundary must be slid past and around the specimen and the specimen is already present, positioning of the boundary is facilitated by opening the jaws, as shown. Similarly, an operator will more easily be able to configure a specimen after the expandable boundary has already been positioned by opening the jaws.

Figure 8A:
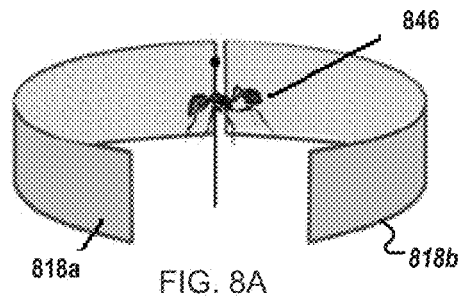
FIGS. 8A to 8F in an illustration of several alternate positions for positioning an expandable boundary with respect to a specimen.
Figure 8B:
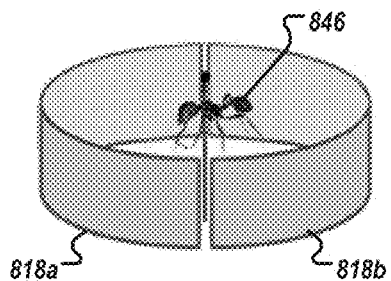

FIG. 8A-F illustrates various examples of positioning the boundary around a specimen 846. Dispensing with the microscope and most of the structure of the apparatus of FIG. 7 for illustration purposes, FIG. 8A-B illustrate the covered light source components 818 as they would be situated in the jaws of the apparatus first open and then closed around the specimen. The light sources 818 in this example are comprised of LED strips covered by a layer of light diffusing material 848 as has been previously described. With the light sources 818 positioned as shown in FIG. 8A, the specimen 846 is surrounded with light from opposite sides. When the jaws (not shown in FIGS. 8A-F) are pushed closed, the light sources 818 fully encircle the specimen 846 with diffused, reflected light as shown in FIG. 8B.

Figure 8C:
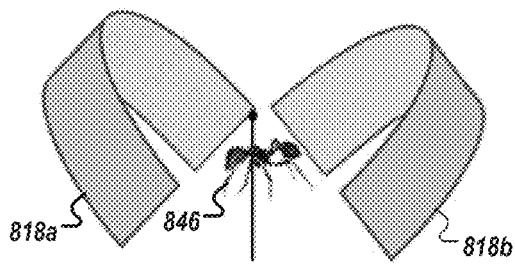
Figure 8D:
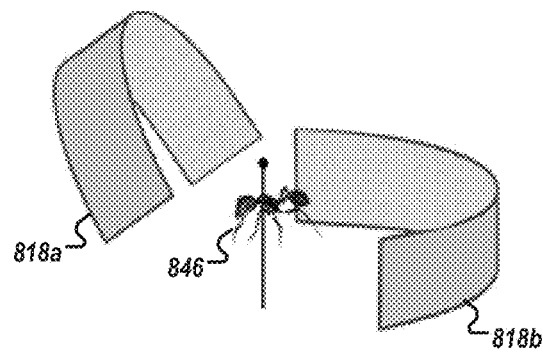
Figure 8E:
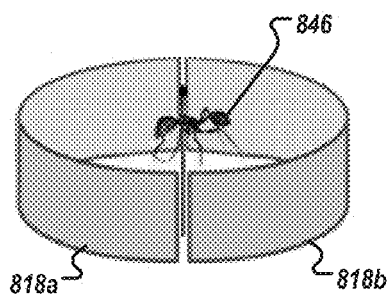
Figure 8F:
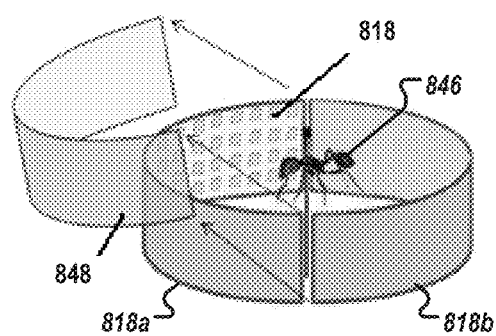

Alternate positions of the same light sources 818 and their spatial relationship to the specimen 846 are shown in FIGS. 8C-D. FIG. 8C illustrates that the light sources 818 may be symmetrically situated with respect to the specimen 846 providing diffused light that is projected on the specimen from opposite and angled directions. FIG. 8D illustrates the light sources 818 are arranged asymmetrically with respect to the specimen 846 so that specific features of the specimen image are enhanced. FIG. 8E illustrates a specimen 846 again shown fully enclosed by the light sources 818 covered by diffusing material 848 and then, because image enhancement necessitates, one of the LED light strips 818 is uncovered to project unconditioned light on the specimen as shown in FIG. 8F.

In another example illustrating only the light source structure of an adjustable lighting apparatus embodiment, FIGS. 9A-I demonstrates several alternate positions for adjusting an expandable boundary so that light sources project back, oblique, and front lighting on a specimen. In this example, a light apparatus having double swiveling joints is selected for imaging a specimen on a microscope stage. The light sources in this example are LED strips and all but one are covered by light diffusing material. Depicting only the positioning of the light sources, the structure of the expandable boundary and joints are not shown.

Figure 9A:
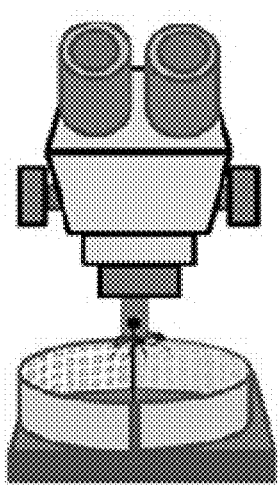
FIGS. 9A to 9I shows several alternate positions for positioning light sources to project back, oblique, or front lighting on a specimen.
Figure 9B:
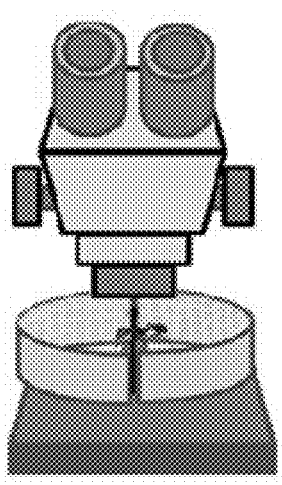
Figure 9C:
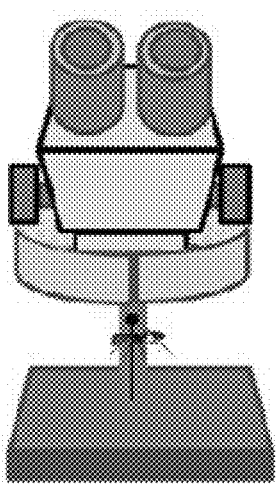
Figure 9D:
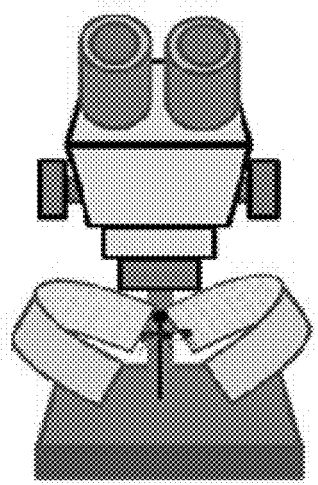
Figure 9E:
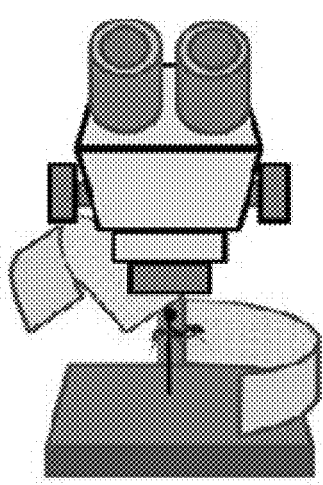
Figure 9F:
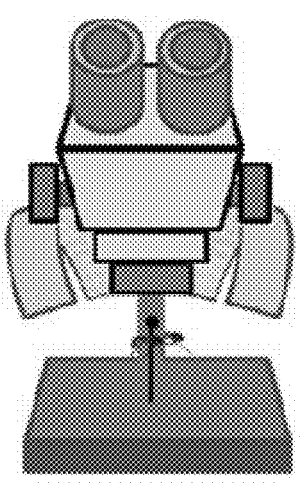
Figure 9G:
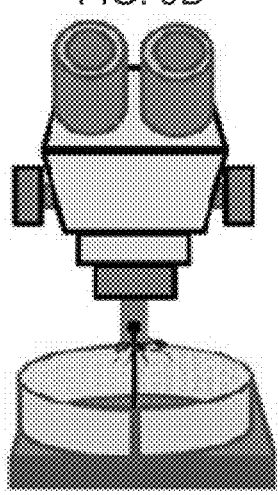
Figure 9H:
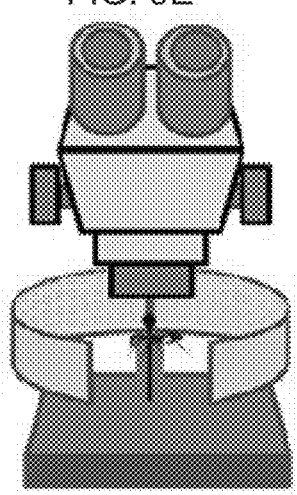
Figure 9I:
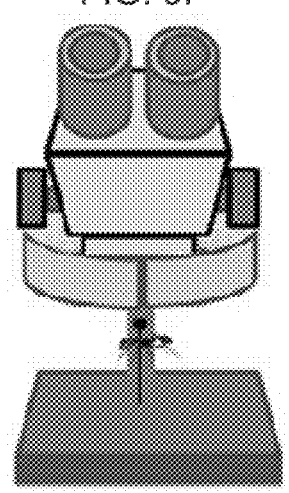
Figure 10A:
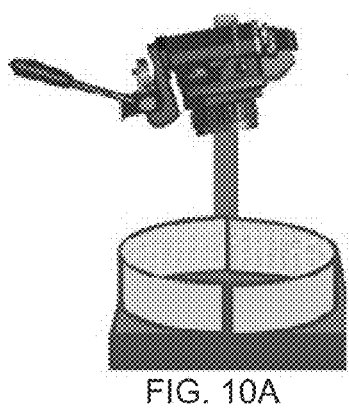
FIGS. 10A to 10I is an illustration of multiple types of imaging equipment and specimens being enhanced with highly adjustable lighting.
Figure 10B:
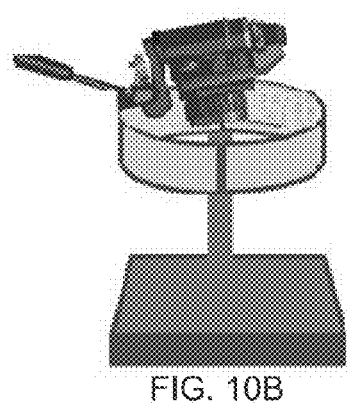
Figure 10C:
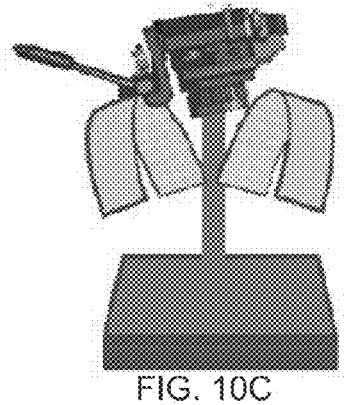
Figure 10D:
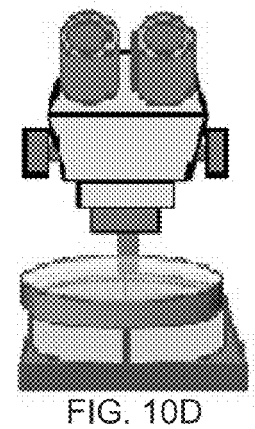
Figure 10E:
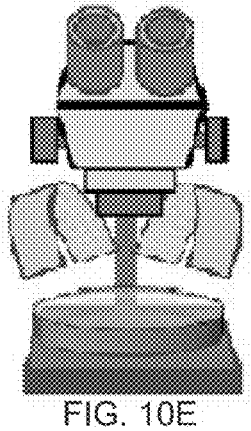
Figure 10F:
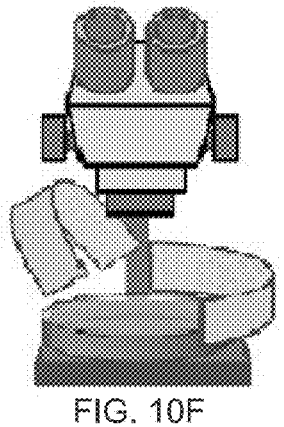
Figure 10G:
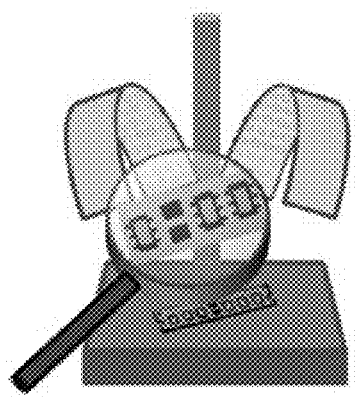
Figure 10H:
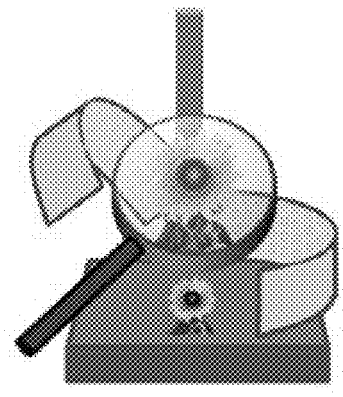
Figure 10I:
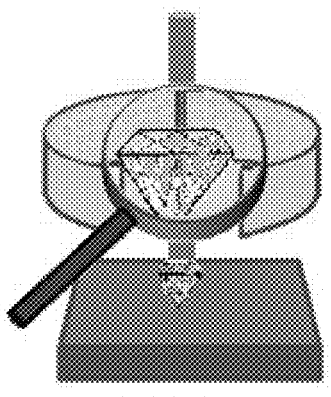

FIGS. 9A-C represent a specimen being imaged with the light sources set below, aside, and above a specimen for producing images with back, oblique, and front lighting features. In general, these light source positions will produce corresponding images illustrating darkfield and brightfield (diascopic and episcopic) features and could also be accomplished by similarly adjusting a lighting apparatus that is not equipped with double swiveling joints. FIGS. 9D-F represent variations of light source positioning for producing brightfield (episcopic) images with different angles of illumination. Similar variations of the light source adjustment exist to project light from below the specimen for providing a range of darkfield and brightfield (diascopic and episcopic) images when the expandable boundary is positioned behind the specimen with respect to the microscope objective. FIGS. 9G-I demonstrate continued specimen accessibility irrespective of where the expandable boundary is positioned and that depending on the positioning, the expandable boundary need not be opened when access is sufficient from above or below. The continued accessibility represented by the expanded boundary positioning represented of the third row is also available to other adjustable lighting apparatus embodiments of the disclosed technology not having double swiveling joints.

FIG. 10 shows an example apparatus used with different types of imaging equipment. The embodiment, again having an expandable boundary and double swiveling joints is shown only as far as its light source structure. FIGS. 10A-C illustrate a camera used with the light sources disclosed herein. The camera may be used for viewing and/or photography and the lighting sources of the apparatus may be moved to bring out desired features as needed. A specimen is easily placed within or removed from the expandable boundary without disrupting the light sources in the three positions shown. FIGS. 10 D-F illustrate microbial growth on media in a petri dish being observed with a microscope using variations of back (transmitted), front, and then medium and highly (90 degree) oblique lighting. Identification of microbes is facilitated for the operator because telling characteristics of the microbe colonies and their effect on media are made more visible by the highly adjustable lighting of the apparatus. In some implementations, a camera is optically connected and used in conjunction with the light microscope to photograph images of a specimen through the microscope objective. FIGS. 10G-I illustrate various different kinds of specimens lighted by the lighting sources disclosed herein being viewed for inspection with a magnifying glass. Images provided by the lens of the glass are optimized by lighting from the disclosed technology and enhance desired features unique to each specimen.

Figure 11A:
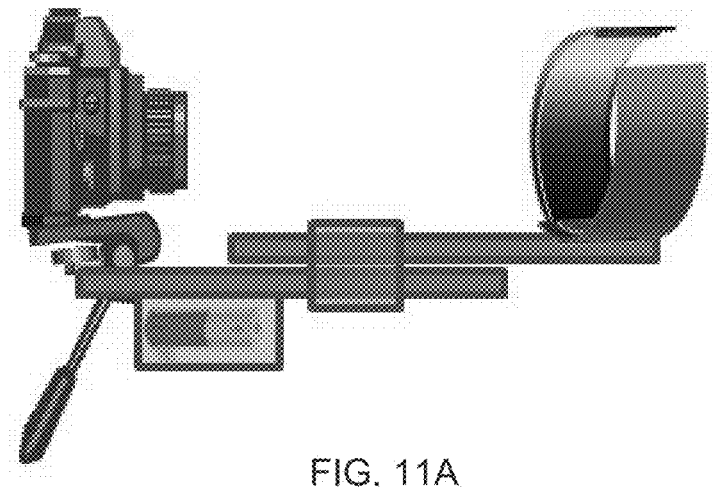
FIGS. 11A and 11B is side perspective view of an example adjustable lighting apparatus being used with a camera to image a specimen in the field.
Figure 11B:
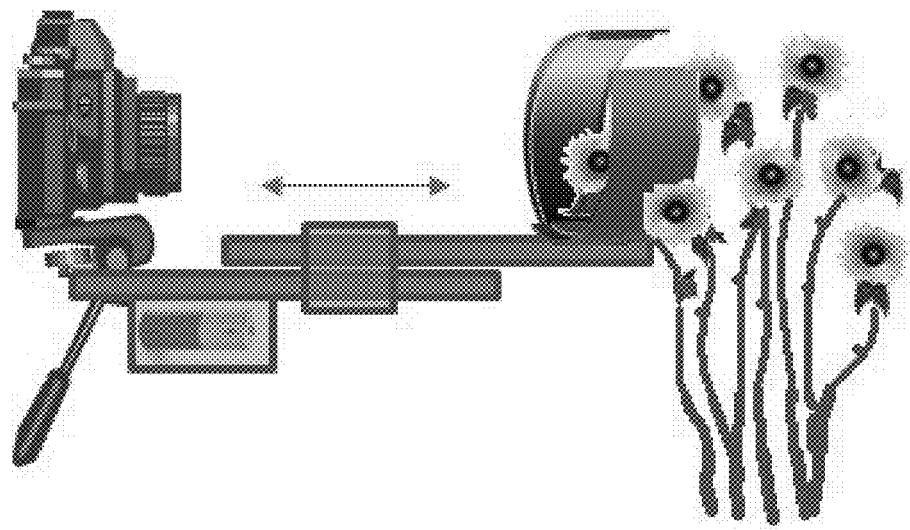

FIGS. 11A-B illustrate an example apparatus used with a camera in the field to image a specimen residing on a flower of a living plant. In some implementations, the camera includes a tripod (not shown) to which one end of an extendable supporting stem is attached. At the opposite end of the supporting stem, an expandable boundary comprising pivoting jaws with, for example, LED light sources on their concave surfaces is situated to illuminate a specimen as it exists in its natural habitat. The stem is positioned and the jaws may be adjusted to encompass the specimen. The flower serves as a substrate upon which the specimen is imaged. In some implementations, the apparatus is used with a hand held camera by anchoring the supporting stem to the camera body directly. In some implementations, the stem is flexible and has the capacity to position the expandable boundary in a wider range of positions with respect to a camera including, without limitation, in close proximity to the camera body, encircling the camera lens tube.

Referring now to the invention in general, an apparatus of the present invention may also be used with other kinds of imaging equipment for which highly adjustable lighting is advantageous. Applications that will particularly benefit are those needing improved access such as when specimens must be imaged quickly and replaced or when numerous adjustments to specimen positioning, configuration and/or conditioning, etc. are the norm.

An adjustable lighting apparatus according to the present invention may be manufactured from a variety of materials, depending on the desired performance to be obtained. In one embodiment, rigid components of an expandable boundary are machined from solid blocks of aluminum to provide sufficient strength and durability. In some implementations, rigid components are cast or formed by bending metal sheet or plate and then completed by machining away unwanted material and welding on additional material as is needed. In some implementations, concave, arcuate jaws are made from sections of prefabricated metal tubes of appropriate diameters by cutting each annulus in half to provide rough concave boundaries. In some implementations, softer, lighter, and less durable materials such as plastics or low cost composites may be substituted for metal, particularly if disposable components are desired. For instance, jaws of an expandable boundary may be manufactured as a sealed plastic component incorporating light sources and batteries so that when the batteries expire the jaws are simply replaced with a new set.

Imaging of a specimen may be accomplished in numerous ways. In some implementations, a specimen is first placed on a stage or platform associated with the particular type of imaging equipment being used. Next, an adjustable lighting apparatus is oriented so that the expandable boundary is approximately in position with respect the specimen. Then, as light is being provided by the apparatus and while the specimen is being observed through the imaging equipment, the expandable boundary is further adjusted to reveal desired details or features of the image. If needed, filters, diffusers or other enhancements may also be added or removed and the light intensity adjusted before or after final adjustment of the light sources to further optimize the image. In some implementations, the specimen may be placed on an equipment stage or platform within an expandable boundary that has previously been adjusted in final position.

In some implementations, numerous specimens having similar characteristics are imaged in rapid sequence using the same general positioning of light sources. After light source adjustment is established for the first specimen, the first specimen is removed and replaced with a second specimen and so on until all specimens are imaged. Depending on the light source positioning, an operator may remove or add specimens by reaching under or over the expandable boundary or the boundary may be opened to provide access to the specimen if needed. When the most optimal images are desired, a final light source adjustment step may be added for each specimen. In some implementations, light source positioning is reestablished by the operator for each new specimen by stops or sensors incorporated into various portions of the adjustable lighting apparatus.

In some implementations, a specimen is illuminated with an adjustable lighting apparatus in situ, ahead of a handheld camera. The apparatus comprises an expandable boundary that stems from the camera body. In coordination with the specimen being framed and focused by the camera lens, the boundary is moved closer or farther from the specimen and side to side relative to the optical axis of the camera and specimen, until desired image characteristics are obtained.

Figure 12:
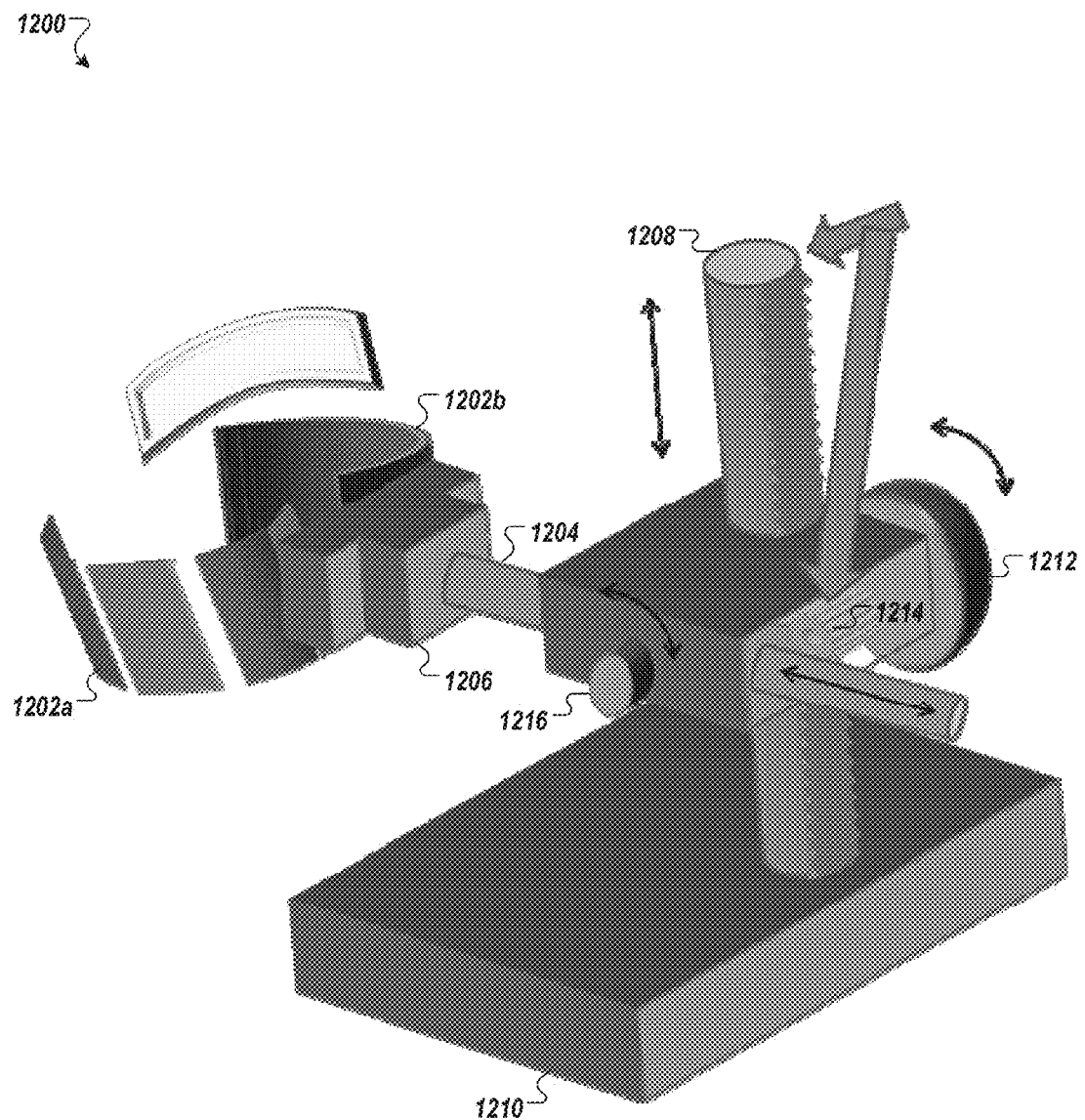
FIG. 12 is an illustration of an example adjustable lighting apparatus implemented with a rack and pinion system.

FIG. 12 is an illustration of an example adjustable lighting apparatus 1200 implemented with a rack and pinion system. In this example, the jaws 1202 are attached to an elongated stem 1204 via a hub 1206. Each of the jaws 1202 may be attached to the hub 1206 by a pivoting hinge (e.g., a double swiveling hinge or ball and socket joint). The position of the jaws 1202 may be adjusted using an adjustable rack and pinion system. A vertical post 1208 is connected to a base 1210 at one end and is movably coupled to the rack and pinion system. The rack and pinion system includes a first gear 1214 with a plurality of teeth configured to engage a plurality of teeth on the vertical post 1208. The first gear 1214 is coupled to a first knob 1212, thereby permitting vertical adjustment of the jaws 1202 by turning of the first knob 1212.

A second gear (not shown) with a plurality of teeth is configured to engage a plurality of teeth on the elongated stem 1204. The second gear is coupled to a second knob 1216, thereby permitting horizontal adjustment of the jaws 1202 by turning of the second knob 1216.

Figure 13A:
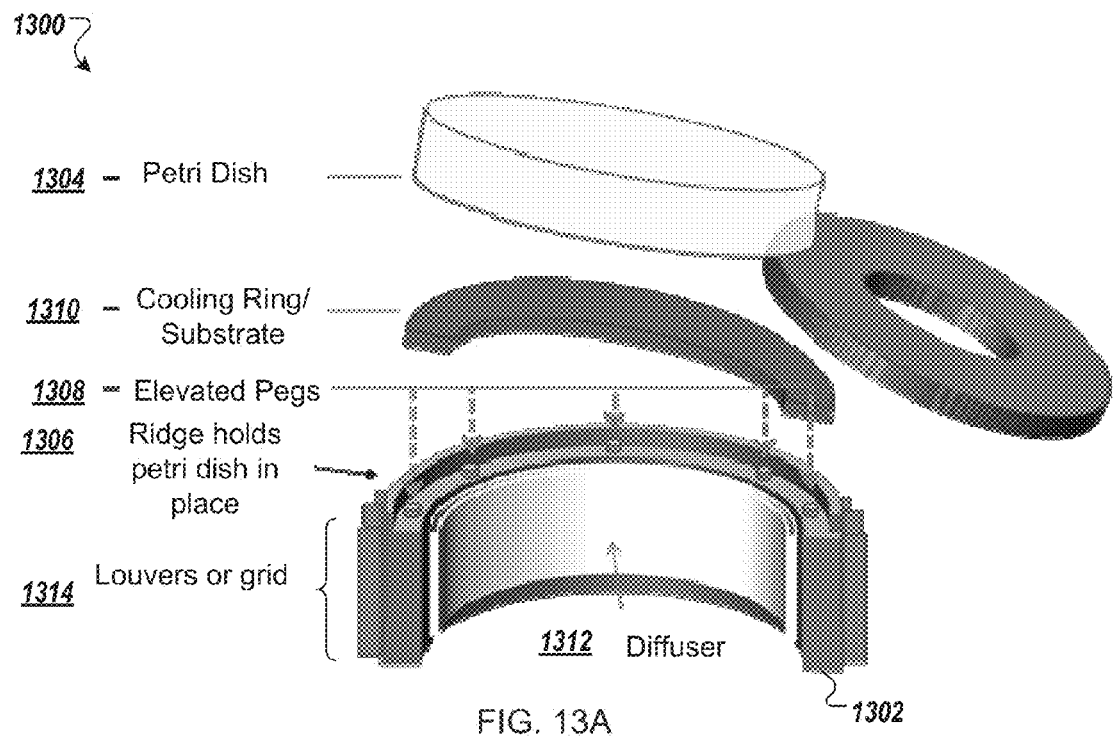
FIGS. 13A and 13B are illustrations of example jaws of an adjustable lighting apparatus.
Figure 13B:
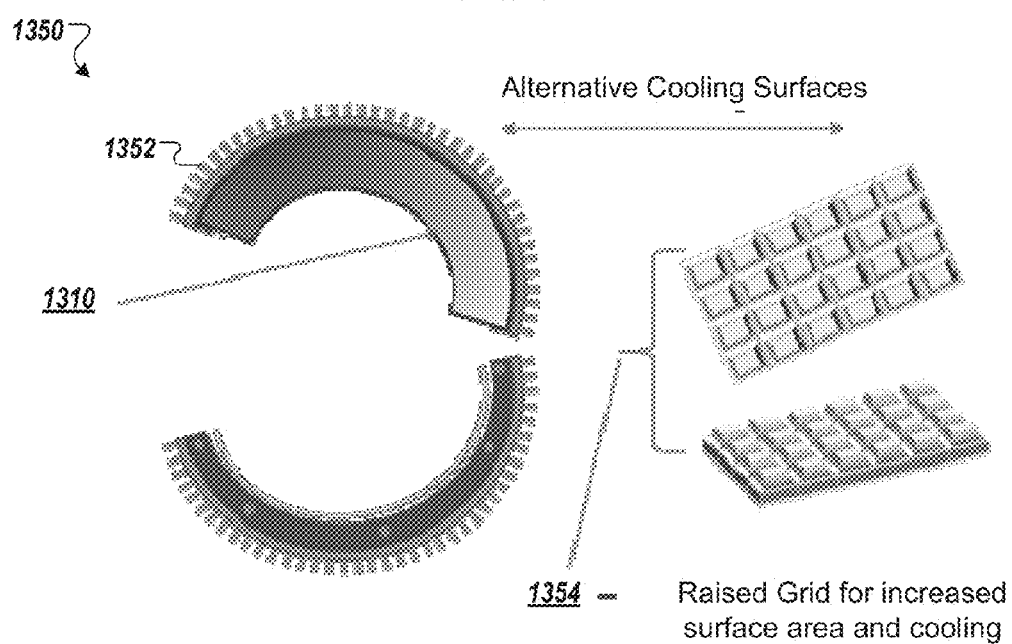

FIGS. 13A and 13B are illustrations of example jaws of an adjustable lighting apparatus 1300. FIG. 13A illustrates an example jaw 1302 for holding a petri dish 1304.

The top outer LED housing, in some implementations, contains an outer lip 1306 and/or vertical tabs extending above the top surface of the housing to hold a standard petri dish 1304 in place when the two sides of the LED housing are closed to forming a continuous ring. The top surface of the outer housing may include a set of pegs 1308 made of plastic or other material with low thermal conductivity to reduce heat transfer between the top of the housing and the bottom of the petri dish 1304. A removable flat wide ring, or two half rings 1310 are included to further hold a petri dish 1304 in place as well as reduce glare for the user when the light is used without a petri dish 1304. In some implementations, a retractable iris is used in place of the solid ring or half rings. As described above, the jaw 1302 may include a diffuser 1312 to diffuse light projected toward the specimen.

Additionally, the jaws 1302 may include louvers 1314 or a grid for cooling the LED housing. FIG. 13B illustration an example jaws 1350 with louvers 1352. Alternatively, the louvers 1352 may be replaced with a raised grid 1354. In this example, the louvers 1352 are engineered into the outer surface of the LED housing for more efficient radiant cooling.

Figure 14:
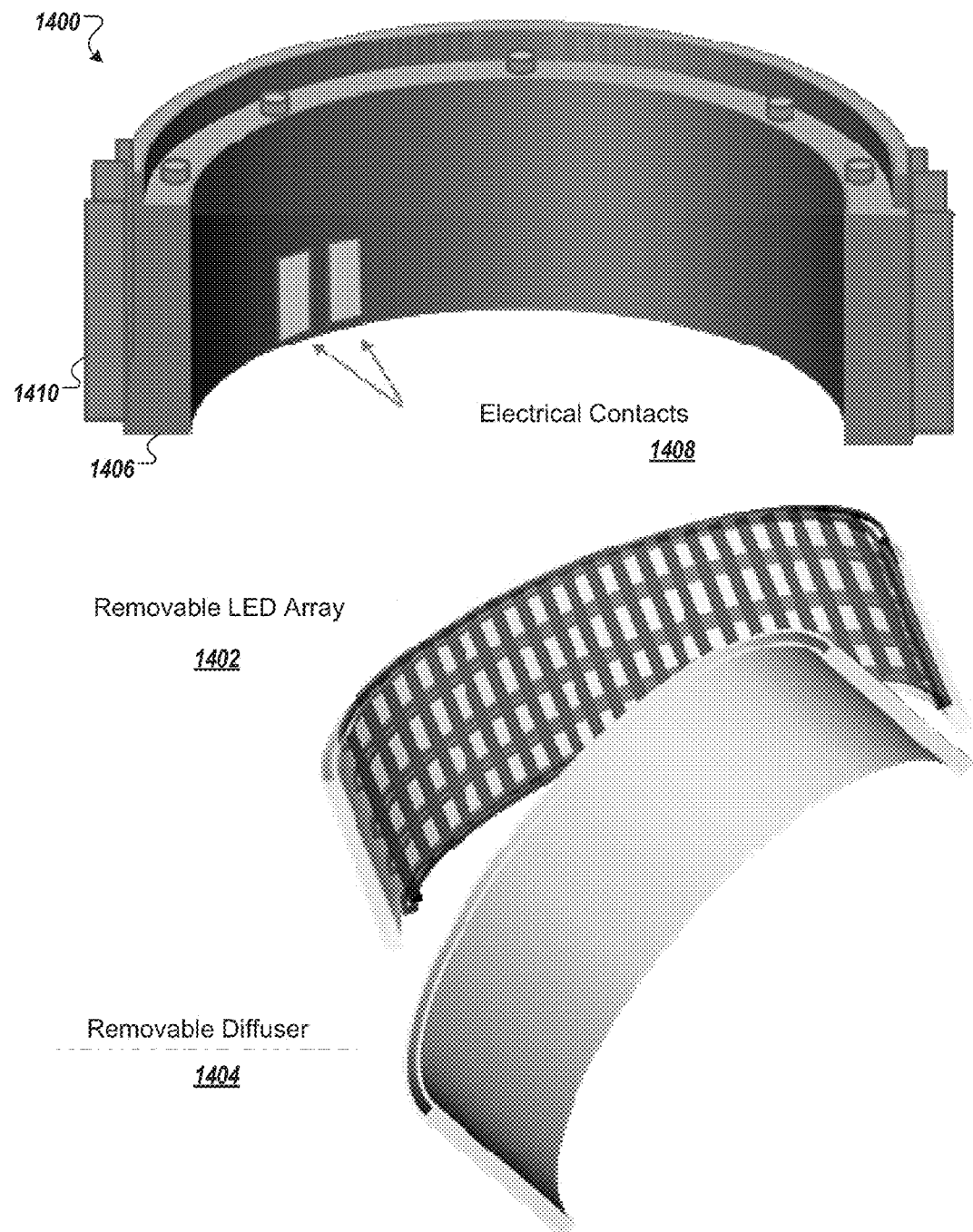
FIG. 14 is an illustration of an example jaw of an adjustable lighting apparatus with a removable LED array.

FIG. 14 is an illustration of an example jaw of an adjustable lighting apparatus 1400 with a removable LED array 1402. This allows for, among other things, exchanging LED for maintenance and for inserting LED arrays or filters with a desired wavelength LED. Moreover, the light sources maybe interchanged between an LED light source, various colored light sources, and/or UV light sources. A diffuser 1404 may be removably coupled to an LED array 1402 using pegs, Velcro strips, or magnets. Thus, the diffuser 1404 may be removed for accessing the inner LED housing and LED ribbon/array 1402. The inner housing 1406 may also be removable. The LED array 1402 may be electrically coupled to the inner housing using electrical contacts 1408. Thus, when the LED array 1402 is attached to the LED housing 1406, the electrical contacts 1408 on the housing 1406 will contact the electrical contacts (not shown) on the LED array 1402. Additionally, the conductive surfaces on the inner housing 1406 may align with contacts contained in the interior surface of the outer housing 1410.

The examples and embodiments provided are intended only as exemplary illustrations and not for the purpose of limiting the scope of the present invention. It will be apparent to those skilled in the art that various changes, modifications, and equivalents in addition to those shown or described are in keeping the spirit and scope of the invention. The entire scope of such possible variations is intended to fall within the meaning of the appended or later amended claims. Having described certain implementations of methods and apparatus for supporting illumination of a specimen, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions may be conducted simultaneously.

What is claimed:

1. An adjustable lighting apparatus for enhanced imaging of a specimen while facilitating access to the specimen, the apparatus comprising:
   a pair of pivotable curved plate jaws collectively defining an expandable boundary positionable to at least partially surround the specimen, wherein each jaw of the pair of pivotable curved plate jaws has a concave interior surface and has one or more light sources positioned within or against the interior surface between a proximate jaw end and a distal jaw end for illuminating a specimen located within the expandable boundary;

a hub to which each jaw of the pair of pivotable curved plate jaws is connected about a first pivot axis and a second pivot axis, the first and second pivot axes configured to allow each jaw of the pair of pivotable curved plate jaws to rotate about each of the first and second pivot axes, thereby permitting the position of each jaw in the pair of pivotable curved plate jaws to be varied such that the specimen image may be enhanced and the specimen accessed by repositioning at least one of the jaws of the pair of pivotable jaws; and an elongated stem connected to the hub at a first end thereof and to a base at a second end thererof, thereby supporting the hub and the pair of pivotable curved plate jaws.

2. The adjustable lighting apparatus of claim 1, wherein the elongated stem is flexible.

3. The adjustable lighting apparatus of claim 1, wherein the apparatus comprises a vertical post to which the elongated stem is slideably connected, thereby permitting horizontal adjustment of the pair of pivotable curved plate jaws.

4. The adjustable lighting apparatus of claim 1, wherein the apparatus comprises a vertical post and a rack and pinion system slideably connected between the elongated stem and the vertical post, thereby permitting vertical adjustment of the pair of pivotable curved plate jaws.

5. The adjustable lighting apparatus of claim 1, comprising a power source within the base, wherein the power source comprises an on/off switch and a dimming circuit in electrical communication with the light sources for adjusting the intensity of the light sources.

6. The adjustable lighting apparatus of claim 1, comprising a plurality of light diffusers each associated with at least one of the light sources, wherein each of the plurality of light diffusers are removeably coupled to a respective pivotable curved plate jaw to cover a respective light source.

7. The adjustable lighting apparatus of claim 1, wherein each of the light sources are at least one of an LED, LED strip, and LED array.

8. The adjustable lighting apparatus of claim 1, wherein at least a portion of the concave surface of each respective pivotable curved plate jaw comprises a reflective surface to reflect light from a respective light source.

9. The adjustable lighting apparatus of claim 1, wherein each of the of pivotable curved plate jaws comprises a plurality of louvers or a raised grid system for providing radiant cooling.

10. The adjustable lighting apparatus of claim 1, wherein each of the pivotable curved plate jaws comprises a protrusion on an upper edge of each pivotable curved plate jaw for holding a petri dish in place when the pair of pivotable curved plate jaws is closed to form a continuous ring.

11. The adjustable lighting apparatus of claim 1, wherein the concave surface of each pivotable curved plate jaw comprises a stepped grooved configured to at least in part hold a respective light source.

12. The adjustable lighting apparatus of claim 1, wherein the jaws close around a specimen in an annular arrangement.

13. The adjustable lighting apparatus of claim 1, wherein the first and second pivot axes of each jaw are defined by pivot pins.

14. The adjustable lighting apparatus of claim 1, wherein the first and second pivot axes of each jaw are defined by a ball and socket joints.

15. An adjustable lighting apparatus for illuminating a specimen while facilitating access to the specimen, the apparatus comprising:

a plurality of pivotable jaws collectively defining an expandable boundary positionable to at least partially surround the specimen, wherein each jaw of the pivotable jaws has a concave interior surface and has one or more light sources positioned within or against the interior surface for illuminating a specimen located within the expandable boundary;

a hub to which the plurality of pivotable jaws are connected by at least one of (i) a respective pivoting hinge and (ii) a respective ball and socket joint, thereby permitting the position of the plurality of pivotable jaws to be varied such that the specimen may be illuminated and accessed by repositioning of one or more of the pivotable jaws;

an elongated stem connected to the hub at a first end and movably connected to a rack and pinion system; and a vertical post connected to a base at a second end and connected to the rack and pinion system, wherein the rack and pinion system comprises:

a first gear with a plurality of teeth configured to engage a plurality of teeth on the vertical post, wherein the first gear is coupled to a first knob, thereby permitting vertical adjustment of the plurality of pivotable jaws by turning of the first knob, and a second gear with a plurality of teeth configured to engage a plurality of teeth on the elongated stem, wherein the second gear is coupled to a second knob, thereby permitting horizontal adjustment of the plurality of pivotable jaws by turning of the second knob.

16. The adjustable lighting apparatus of claim 15, wherein each of the pivoting hinges comprises a double swiveling joint.

17. The adjustable lighting apparatus of claim 15, comprising a plurality of light diffusers each associated with at least one of the light sources, wherein each of the plurality of light diffusers are removeably coupled to a respective pivotable jaw to cover a respective light source.

18. The adjustable lighting apparatus of claim 15, wherein each of the light sources are at least one of an LED, LED strip, and LED array.

19. The adjustable lighting apparatus of claim 15, wherein at least a portion of the concave surface of each respective pivotable jaw comprises a reflective surface to reflect light from a respective light source.

20. The adjustable lighting apparatus of claim 15, wherein each of the plurality of pivotable jaws comprises a plurality of louvers or a raised grid system for providing radiant cooling.

21. The adjustable lighting apparatus of claim 15, wherein each of the plurality of pivotable jaws comprises a protrusion on an upper edge of each pivotable jaw for holding a petri dish in place when the plurality of pivotable jaws are closed to form a continuous ring.

* * * * *

UNITED STATES PATENT AND TRADEMARK OFFICE
CERTIFICATE OF CORRECTION

PATENT NO. : 9,557,551 B2  
APPLICATION NO. : 14/335730  
DATED : January 31, 2017  
INVENTOR(S) : Joseph Knight Staples It is certified that error appears in the above-identified patent and that said Letters Patent is hereby corrected as shown below:

In the Claims

Column 17, Claim 9, Line 51, delete the second occurrence of the word "of".

Signed and Sealed this
Twenty-first Day of March, 2017

Michelle K. Lee
*Director of the United States Patent and Trademark Office*